US010628524B2

(12) United States Patent
Qiao et al.

(10) Patent No.: US 10,628,524 B2
(45) Date of Patent: Apr. 21, 2020

(54) INFORMATION INPUT METHOD AND DEVICE

(71) Applicant: BEIJING SOGOU TECHNOLOGY DEVELOPMENT CO., LTD., Beijing (CN)

(72) Inventors: Yujing Qiao, Beijing (CN); Bin Chen, Beijing (CN); Dong Wang, Beijing (CN); Hao Yu, Beijing (CN); Kuo Zhang, Beijing (CN)

(73) Assignee: BEIJING SOGOU TECHNOLOGY DEVELOPMENT CO., LTD., Beijing (CN)

( * ) Notice: Subject to any disclaimer, the term of this patent is extended or adjusted under 35 U.S.C. 154(b) by 25 days.

(21) Appl. No.: 15/559,774

(22) PCT Filed: Aug. 18, 2015

(86) PCT No.: PCT/CN2015/087403
§ 371 (c)(1),
(2) Date: Feb. 1, 2018

(87) PCT Pub. No.: WO2016/150083
PCT Pub. Date: Sep. 29, 2016

(65) Prior Publication Data
US 2018/0181560 A1 Jun. 28, 2018

(30) Foreign Application Priority Data
Mar. 24, 2015 (CN) .......................... 2015 1 0131329

(51) Int. Cl.
G06F 17/27 (2006.01)
G10L 15/00 (2013.01)
(Continued)

(52) U.S. Cl.
CPC ........ G06F 17/2785 (2013.01); G06F 16/243 (2019.01); G06F 16/248 (2019.01);
(Continued)

(58) Field of Classification Search
CPC .... G06F 17/2785; G06F 17/279; G06F 17/30; G06F 17/30401; G06F 17/30477; G06F 17/30554; G06F 17/30864
(Continued)

(56) References Cited

U.S. PATENT DOCUMENTS 5,694,163 A * 12/1997 Harrison ................. H04N 7/14
348/468
7,904,922 B1 * 3/2011 Haberman ........... G06Q 10/107
715/201
(Continued)

FOREIGN PATENT DOCUMENTS

CN 101017489 A 8/2007
CN 101360071 A 2/2009
(Continued)

OTHER PUBLICATIONS

The World Intellectual Property Organization (WIPO) International Search Report for PCT/CN2015/087403 dated Dec. 23, 2015 6 Pages (including translation).

Primary Examiner — Khai N. Nguyen
(74) Attorney, Agent, or Firm — Anova Law Group, PLLC

(57) ABSTRACT

An information input method and device are provided, which are related to the technical field of input method. The method comprises: acquiring candidates corresponding to an encoded string that is inputted, and determining a target query string from the candidates; searching the target query string, and obtaining a corresponding search result; extracting corresponding target content from the search result; and
(Continued)

when an information-ending interface of a first chat client is detected to be triggered, using a first template provided by the first chat client to reconstruct the target content into first template information recognizable by the first chat client, and sending the first template information to a second chat client.

15 Claims, 9 Drawing Sheets

(51) Int. Cl.
   *G10L 15/18* (2013.01)
   *G06F 16/242* (2019.01)
   *G06F 16/248* (2019.01)
   *G06F 16/951* (2019.01)
   *G06F 16/2455* (2019.01)

(52) U.S. Cl.
   CPC ...... *G06F 16/2425* (2019.01); *G06F 16/2455* (2019.01); *G06F 16/951* (2019.01); *G06F 17/279* (2013.01)

(58) Field of Classification Search
   USPC .............................................. 704/9
   See application file for complete search history.

(56) References Cited

U.S. PATENT DOCUMENTS

| | | | |
|---|---|---|---|
| 8,006,261 B1* | 8/2011 | Haberman | G11B 27/031 725/32 |
| 9,785,671 B2* | 10/2017 | Arroyo | G06F 16/245 |
| 2009/0254840 A1* | 10/2009 | Churchill | G06F 3/0481 715/753 |
| 2014/0259188 A1* | 9/2014 | Forrest | H04L 63/04 726/29 |
| 2015/0019589 A1* | 1/2015 | Arroyo | G06F 16/245 707/779 |
| 2015/0082201 A1* | 3/2015 | Sung | H04L 51/04 715/753 |
| 2016/0225369 A1* | 8/2016 | Agrawal | G10L 15/22 |
| 2016/0225371 A1* | 8/2016 | Agrawal | G06F 3/04842 |
| 2017/0094484 A1* | 3/2017 | Li | H04L 51/24 |
| 2018/0024727 A1* | 1/2018 | Oh | G06F 1/1692 715/798 |
| 2018/0181560 A1* | 6/2018 | Qiao | G06F 17/279 |

FOREIGN PATENT DOCUMENTS

| | | |
|---|---|---|
| CN | 102193949 A | 9/2011 |
| CN | 102262624 A | 11/2011 |

\* cited by examiner

INFORMATION INPUT METHOD AND DEVICE

This application is a national phase entry under 35 U.S.C § 371 of International Application No. PCT/CN2015/087403, filed on Aug. 18, 2015, which claims priority of Chinese Patent Application No. 201510131329.6, entitled "INFORMATION INPUT METHOD AND DEVICE", filed with the State Intellectual Property Office of P. R. China on Mar. 24, 2015, the entire contents of all of which are incorporated herein by reference.

FIELD OF THE DISCLOSURE

The present disclosure generally relates to the technical field of input method and, more particularly, relates to an information input method and device.

BACKGROUND

With the development of technologies, the word and phrase input functions of input methods are becoming more and more accurate and sophisticated. However, if the user uses an input method to input words in the chat interface of a chat client, for the user, when currently inputting a word/phrase, more information related to such word/phrase may highly likely need to be looked up and sent to the chat client. For example, in the chat interface, when the chat partner says "wanna watch a movie", the current user may need to notify the chat partner of information such as movies now playing, where the movies are shown, and the show times of the movies. In existing technologies, to realize the aforementioned process, often the current user needs to leave the current chat interface, open a browser or a search application, and launch an input method to input the keyword of the content desired by the user in the search box. After obtaining the search result, information may be inputted to the chat interface of the chat client via copy or screenshot of the search result, and the information may be clicked and sent in the chat interface for transmission to the chat partner.

However, in the above-described traditional process, the following issues exist.

First, the user of the current chat client needs to first leave the chat interface of the chat client and then perform a search process in other software. Thus, the continuous chat process of the user is interrupted, and the number of operations performed by the user is increased.

Further, if in the input process, the user needs to perform searching for a couple of times, the cost for the current user to perform switching is very high.

Further, after obtaining the search result, the user of the current chat client may need to perform complicated copy/paste, screenshot, or process-sharing to send the search result to the target chat client. The information copied or screenshotted by the user may be relatively disordered, and relatively precise and concise information may not be sent to the target client. Further, the search result sent via copy/paste or screenshot may have a poorly organized layout, which increases the reading difficulty of the chat partner and increases the communication cost.

BRIEF SUMMARY OF THE DISCLOSURE

Directed towards the aforementioned issues, the present disclosure is proposed to provide an information input method and a corresponding information input device to overcome the aforementioned issues, or to at least partially solve the aforementioned issues.

According to one aspect of the present disclosure, an information input method is provided, comprising:
  acquiring candidates corresponding to an encoded string that is inputted, and determining a target query string from the candidates;
  searching the target query string, and obtaining a corresponding search result;
  extracting corresponding target content from the search result; and
  when an information-ending interface of a first chat client is detected to be triggered, using a first template provided by the first chat client to reconstruct the target content into first template information recognizable by the first chat client, and sending the first template information to a second chat client.

According to another aspect of the present disclosure, an information input method is provided, comprising:
  acquiring candidates corresponding to an encoded string that is inputted, and determining a target query string from the candidates;
  searching the target query string, and obtaining a corresponding search result;
  extracting corresponding target content from the search result; and
  using a second template provided by a current input method program to reconstruct the target content into second template information recognizable by the input method program, and displaying the second template information in a current input method interface.

According to another aspect of the present disclosure, an information input device is provided, comprising:
  a query string determining module, configured to acquire candidates corresponding to an encoded string that is inputted, and determine a target query string from the candidates;
  a search result acquiring module, configured to searching the target query string and obtain a corresponding search result;
  a search result analyzing module, configured to extract corresponding target content from the search result; and
  a sending module configured to, when an information-ending interface of a first chat client is detected to be triggered, use a first template provided by the first chat client to reconstruct the target content into first template information recognizable by the first chat client, and send the first template information to a second chat client.

According to another aspect of the present disclosure, an information input device is provided, comprising:
  a query string determining module, configured to acquire candidates corresponding to an encoded string that is inputted, and determine a target query string from the candidates;
  a search result acquiring module, configured to search the target query string and obtain a corresponding search result;
  a search result analyzing module, configured to extract corresponding target content from the search result; and
  a content displaying module configured to, use a second template provided by a current input method program to reconstruct the target content into second template information recognizable by the input method program, and display the second template information in a current input method interface.

According to another aspect of the present disclosure, a computer readable recording medium for storing a program that is configured to execute the aforementioned method is provided.

With respect to the existing technologies, the present disclosure has the following advantages.

In the present disclosure, when a chat client A (may be understood as the first chat client of the present disclosure) chats with a chat client B (may be understood as the second chat client of the present disclosure), a user may acquire the search result of a corresponding candidate directly in the chat client A via the input method. The user may convert the search result to precise and concise target content, and reconstruct the target content to template information in a form recognizable by the chat client B for sending to the chat client B, thereby improving the richness of the input information. For the user of the chat client A:

First, because the input method stays in the chat client currently used by the user, the user does not need to leave the chat interface of the chat client to perform a search process in other software. Thus, the continuous chat process of the user may be ensured, and no additional switching operation is needed.

Further, if the user needs to perform searching for several times in the input process, because no addition switching operation is performed, the switching cost is nearly zero.

Further, the user is no longer required to perform the complicated copy/paste, screenshot, or process-sharing operation to send the search result to the chat partner, and precise and concise target content may be sorted out from the search result automatically. Further, the target content may be reconstructed and arranged in a form suitable for reading in the second chat client in order to be sent to the second chat client. That is, the content may be more suitable for reading by the chat partner, and the communication cost may be reduced.

The foregoing is only brief description of technical solutions in the present disclosure, and to facilitate a clearer understanding of technical approaches of the present disclosure, embodiments of the present disclosure may be implemented based on content of the specification. To further illustrate the aforementioned and other objectives, features and advantages of the present disclosure, specific implementations of the present disclosure are provided hereinafter.

BRIEF SUMMARY OF THE DRAWINGS

From a reading of detailed descriptions of the optional embodiments given hereinafter, various other advantages and merits will become more obvious to those ordinarily skilled in the relevant art. The accompanying drawings are only used to illustrate the objectives of the provided optional embodiments, and shall not be construed as limiting of the present disclosure. Throughout the accompanying drawings, the same reference numerals refer to the same components. In the drawings.

DETAILED DESCRIPTION

Exemplary embodiments of the present disclosure will be described more fully hereinafter with reference to the accompanying drawings. Though exemplary embodiments of the present disclosure are illustrated with reference to the accompanying drawings, it shall be understood that, the present disclosure may be embodied in various forms and shall not be limited by embodiments disclosed herein. On the contrary, these embodiments are provided to facilitate the understanding of the present disclosure and to fully convey the scope of the present disclosure to those skilled in the relevant art.

One of the main principles of the present disclosure lies in that: in the chat client used by a user, based on candidates corresponding to a string inputted by the user, a target query string may be determined, and the target query string is used to search over a server to retrieve a corresponding search result. Further, target content is extracted from the search result, and a first template provided by the first chat client is used to reconstruct the target content into first template information recognizable by the first chat client. The first template information is sent to the second chat client where the chat partner is in. In particular, the target content may be certain structural information that matches most with the input intent of the user, and the first template information obtained by reconstruction may be recognized by the second chat client where the chat partner is in. As such, in the current input method program, searching of target content that corresponds to a candidate may be realized, and the target content may be reconstructed into first template information to be directly sent to the second chat client where the chat partner is in. Thus, the user may not need to switch a carrier program of the input method, and the input method may stay in the chat client currently used by the user, such that not only the richness of the input information is improved, but also the user does not need to leave the chat interface of the chat client to perform a search process in other software. Accordingly, the continuous chat process of the user is ensured. Further, because no additional switching operation is performed, the switching cost is nearly zero, and the user is not required to perform complicated copy/paste, screenshot, or process-sharing in order to send the search result to the chat partner. That is, the precise and concise target content may be sorted out automatically from the search result, and the target content may be arranged into the first template information to be sent to the second chat client. Accordingly, the system resource may be saved, and the communication cost may be reduced.

Embodiment 1

Figure 1:
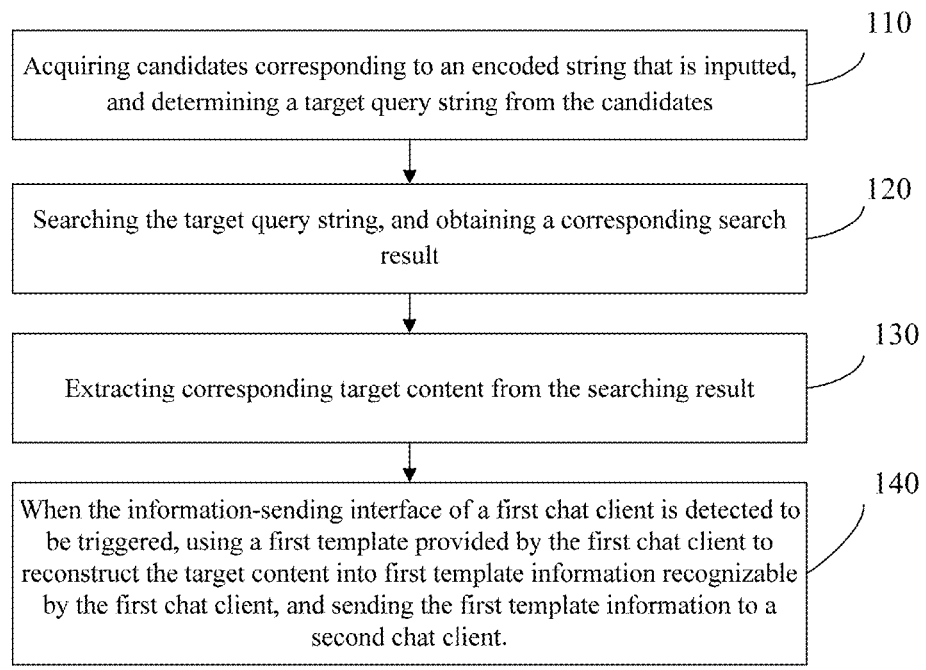
FIG. 1 illustrates a flow chart diagram of an information input method according to Embodiment 1 in embodiments of the present disclosure.

Referring to FIG. 1, a flow chart diagram of an information input method according to Embodiment 1 of the present disclosure is provided. The method may specifically include:

Step 110, acquiring candidates corresponding to an encoded string that is inputted, and determining a target query string from the candidates.

In the disclosed embodiment, the input method program is started and is used in the first chat client. The first chat client and the second chat client mentioned in the present disclosure may be instant chat clients such as QQ, Wechat, Fetion, and Aliwangwang (also called Trademanager). Or, the first chat client and the second chat client may be clients having an instant messaging function, such as a browser, in which certain instant messaging functions may be implemented via webpages. Optionally, the first chat client and the second chat client may be other clients having a chat function, such as an email client, using which the user may chat with others via email.

For example, for the QQ client A, in the chat interface where the QQ client A used by a user chats with the QQ client B, after the disclosed input method program is started, the user may input an encoded string of "quanjude" in the input method program. The input method program may recognize the encoded string to obtain various candidates, such as "Quan Ju De (the name of a famous Chinese restaurant)". According to the present disclosure, one or more candidates may be used as the target query string.

In specific implementations, the first candidate shown in the input method candidate bar may be treated as the target query string by default. For example, "Quan Ju De" may be the first candidate for use as the target query string. Obviously, the target query string may be determined through other methods. For example, a cloud candidate obtained from the server may be determined to be the target query string, and the present disclosure is not limited thereto.

Optionally, after Step 110, the method further comprises:

Step 112, adding a preset search-triggering interface to the target query string, and displaying the search-triggering interface when the target query string is displayed; and when a triggering operation performed by the user on the search-triggering interface is determined to be received, Step 120 is used.

Figure 1A:
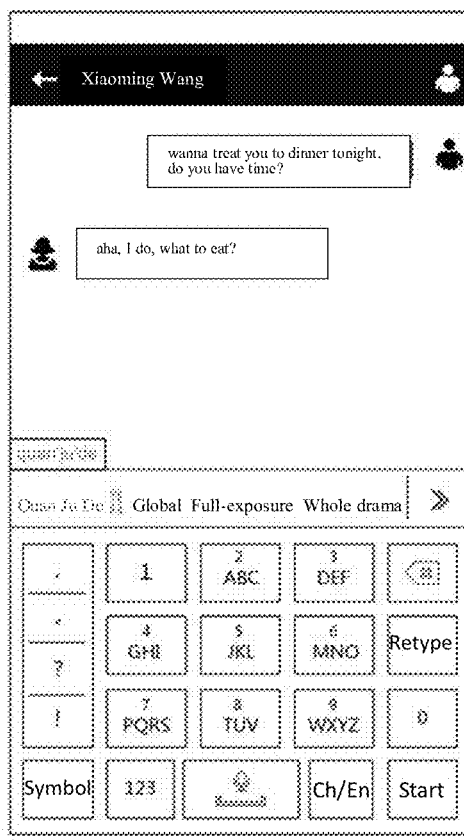
FIG. 1A illustrates a displaying example of a search-triggering interface of a target query string according to embodiments of the present disclosure.

As shown in FIG. 1A, after the candidate "Quan Ju De" is determined to be the target query string, a preset search-triggering interface may be added to the target query string, and the added search-triggering interface is displayed when the target query string is displayed. For example, in FIG. 1A, when the target query string "Quan Ju De" is displayed, a corresponding button (i.e., the search-triggering interface) is displayed next to the display location of "Quan Ju De". When the user clicks the button, the triggering operation performed by the user on the search-triggering interface is determined to be received, and Step 120 is jumped to, thereby entering the search process. If the triggering operation performed by the user on the search-triggering interface is not received, no subsequent operation is executed.

Step 120, searching the target query string, and obtaining a corresponding search result.

For example, for "Quan Ju De" described previously in FIG. 1A, after the button next to "Quan Ju De" is clicked, the first chat client may generate a search request comprising "Quan Ju De", and the search request may be sent to the search server. In the search server, searching may be performed using "Quan Ju De" as the target query string, and a search result may be obtained. For example, the search result comprising search items such as "Quan Ju De (Qianmen sub-store)", and "Quan Ju De (Tsinghua campus sub-store)" may be obtained.

In practical implementation, a plurality of search results may be obtained. Embodiments of the present disclosure may, based on dimensions such as the popularity of each search result and the region where the user is, filter the search results. Optionally, based on the categories that the search results belong to, the search results may be filtered uniformly based on the respective popularity of the search results in each category.

Step 130, extracting corresponding target content from the search result.

For example, the aforementioned search result may include related webpages of each sub-store of "Quan Ju De". The present disclosure may extract needed structural property information, such as structural information of "store name", "average cost", and "star rating", from the webpages for use as the target content. Optionally, the structural information may further include link information for the user to perform a triggering selection.

Optionally, after Step 130, the method further comprises:

Step 132, using a second template provided by the current input method program to reconstruct the target content into second template information that comprises a sending interface, and displaying the second template information in the current input method interface; and when the triggering operation performed by the user on the sending interface is determined to be received, sub-Step 142 of Step 140 is jumped to.

In embodiments of the present disclosure, after the target content is obtained as described previously, the second template provided by the current input method program may be used to reconstruct the target content into the second template information recognizable by the input method program, and the second template information may be displayed in the current input method interface. When the second template information is displayed, the range of the display content may be adjusted based on the size of the input method interface. In embodiments of the present disclosure, the location of the second template information displayed in the input method may be a portion of the input method interface excluding the region of the candidate bar.

Figure 1B:
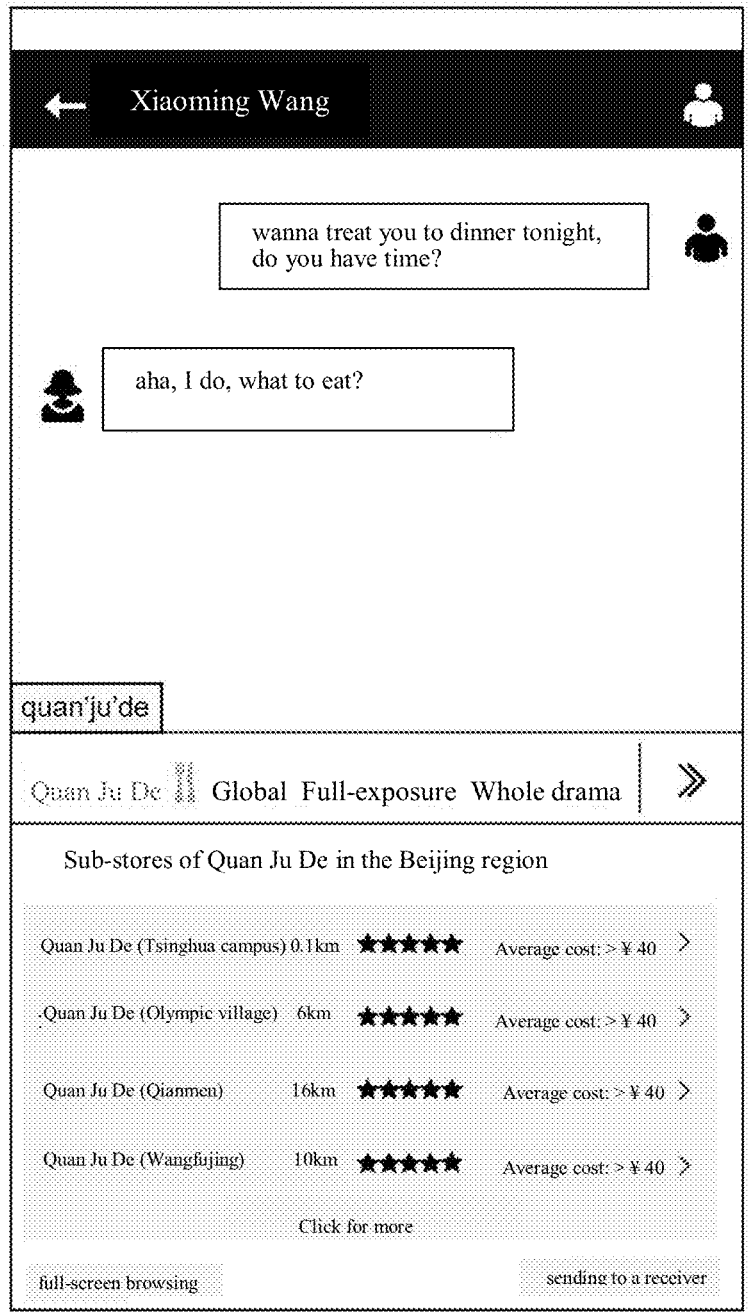
FIG. 1B illustrates a displaying example of a search result in an input method based on FIG. 1A.

As shown in FIG. 1B, the second template information obtained by reconstruction of related information of four sub-stores of Quan Ju De in the Beijing region may be displayed on the input method interface below the candidate bar.

In specific implementation, the second template information may include a sending interface, such as a button of "sending to a receiver" in FIG. 1B. After the user clicks "sending to a receiver", the sub-Step 142 is jumped to.

Further, other than including the sending interface, the second template information may further include other interfaces, such as buttons of "full-screen browsing" and "click for more" in FIG. 1B. When the user clicks "full-screen browsing" with an intention of browsing more target content in the full-screen mode, the disclosed input method may control the whole screen to display the target content. When the user clicks the button of "click for more" in FIG. 1B, additional target content may cover the currently displayed target content.

Optionally, the second template information may further include one or more search items. After Step 132, the method further comprises:

Step 134, after receiving a triggering operation on a certain search item in the second template information, acquiring detailed information of the search item as the target content, and returning to execute Step 132.

For example, after the second template information in FIG. 1B is displayed, when the user wants to know the specific content of a certain search item, the search item may be clicked. Thus, the detailed information of the search item may be obtained as the target content, and Step 132 may be once again executed. When the triggering operation performed by the user on the sending interface in the second template information is determined to be received, sub-step 142 is jumped to.

Figure 1C:
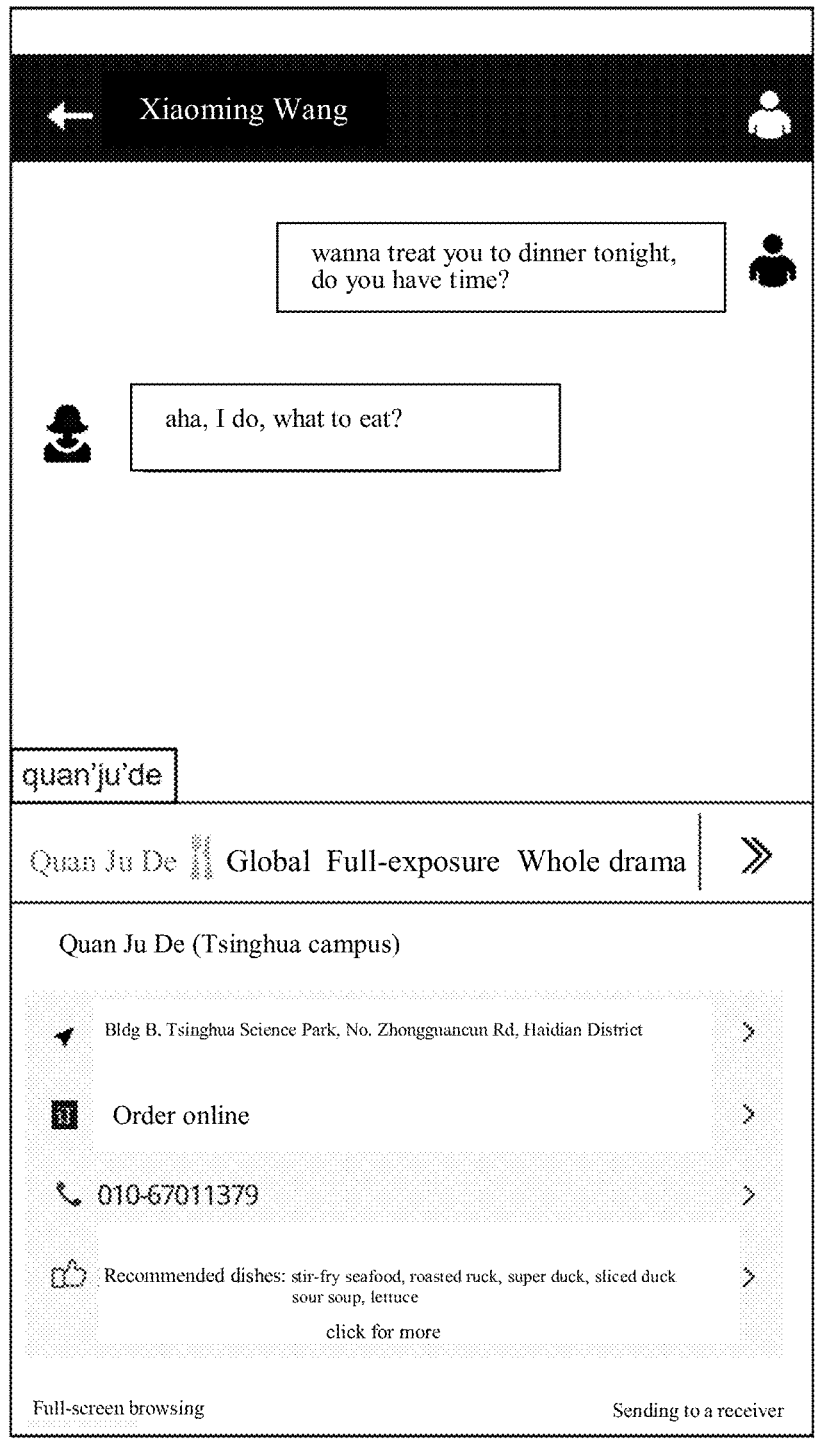
FIG. 1C illustrates a displaying example of a search result in an input method after a search item is clicked based on FIG. 1B.

More specifically, when the triggering operation on a certain search item in the second template information is received, a keyword of the search item may be used as the search word for further searching. For example, after the user clicks the search item of "Quan Ju De (Tsinghua campus sub-store)" in FIG. 1B, the present disclosure may use the "Quan Ju De (Tsinghua campus sub-store)" as the search word for searching, thereby obtaining the detailed information of "Quan Ju De (Tsinghua campus sub-store)" and, further, the corresponding property information of the detailed information may be extracted as the target content. By once again using the second template provided by the input method program, the target content may be reconstructed into the second template information, and the second template information may be displayed in the current input method interface. As shown in FIG. 1C, the second template information introduces the address, phone number, recommended dishes, and online ordering link, etc. of "Quan Ju De (Tsinghua campus sub-store)".

Obviously, in the present disclosure, for search intentions belonging to the same category, multi-level second template information may be constructed. In the search result obtained by using one candidate as the target query string for searching, the target content is extracted, and a first-level second template may be used to reconstruct the target content into first-level second template information for display in the input method. When a specific search item in the first-level second template information is clicked, a second-level second template in the aforementioned category may be invoked, and the property information of the search item may be reconstructed into second-level second template information based on the second-level second template for structural display in the input method. Optionally, more templates in other levels may exist, which may be configured based on practical situations.

It should be noted that, in the second template information obtained by reconstruction using the detailed information of the search item as the target content, other than the sending interface, buttons similar to the aforementioned buttons such as "full-screen browsing" and "click for more" may be further included. Functions of the buttons are similar to that in the foregoing descriptions.

In Step 140, when the information-sending interface of the first chat client is detected to be triggered, the first template provided by the first chat client is used to reconstruct the target content into the first template information recognizable by the first chat client, and the first template information is sent to the second chat client.

After acquiring the target content, based on the first template provided by the first chat client, the target content may be directly reconstructed into the first template information. For example, if the user uses the aforementioned QQ chat client A, when the user clicks the information-sending interface in the QQ chat client A, the input method program may invoke the first template provided by the QQ chat client A to reconstruct the target content into the first template information in real-time based on the format supported by the QQ chat client A or the QQ chat client B. Further, the first template information may be sent to the QQ chat client B.

Optionally, based on Step 132, when the triggering operation performed by the user on the sending interface in the second template information is determined to be received, Step 140 may comprise:

Sub-step 142, using the first template provided by the first chat client to reconstruct the second template information into first template information in real-time, and sending the first template information to the second chat client.

In specific implementation, when the user executes the triggering operation on the sending interface in the second template information, the second template information may be directly converted into the first template information recognizable by the first chat client or the second chat client. Further, the first template information may be sent to the second chat client.

Figure 1D:
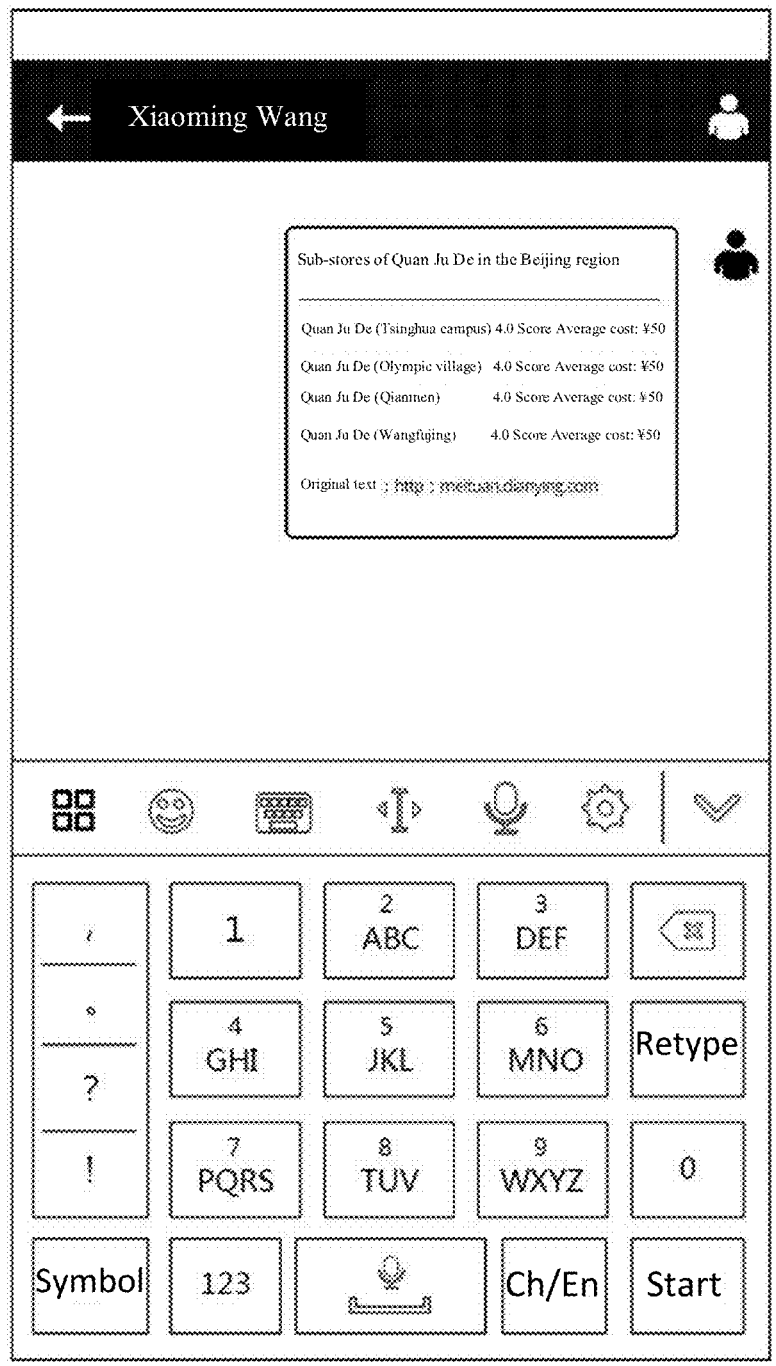
FIG. 1D illustrates a displaying example after a sending interface is clicked based on FIG. 1B.

Further, each property in the second template information may be analyzed and extracted in real-time, and the content and form inappropriate for display in the layout of the chat session may be deleted. For example, in the above-described embodiment, the distance from each "Quan Ju De" sub-store to the current location may be deleted, and the rating of each sub-store may have a changed display form, thereby obtaining the first template information, as shown in FIG. 1D.

In the present disclosure, when the chat client A (may be understood as the first chat client of the present disclosure) chats with the chat client B (may be understood as the second chat client of the present disclosure), the user may acquire a search result of the corresponding candidate in the chat client A via the input method. The search result may be converted to precise and concise target content, and the target content may be reconstructed into template information in a form recognizable by the chat client B for sending to the chat client B. Thus, for the user of the chat client A:

First, because the input method stays in the chat client currently used by the user, the user does not need to leave the chat interface of the chat client to perform a search process in other software. Thus, the continuous chat process of the user may be ensured, and no additional switching operation is needed.

Further, if in the input process, the user needs to perform searching for several times, because no addition switching operation is performed, the switching cost is nearly zero.

Further, the user is not required to perform complicated copy/paste, screenshot, or process-sharing in order to send the search result to the chat partner, and precise and concise target content may be sorted out from the search result automatically. Further, the target content may be reconstructed and arranged in a form suitable for reading in the second chat client for sending to the second chat client. Thus, the content may be more suitable for reading by the chat partner, and the communication cost may be reduced.

Further, with respect to pure word input of the input method, the disclosed input information may have enhanced richness.

Embodiment 2

Figure 2:
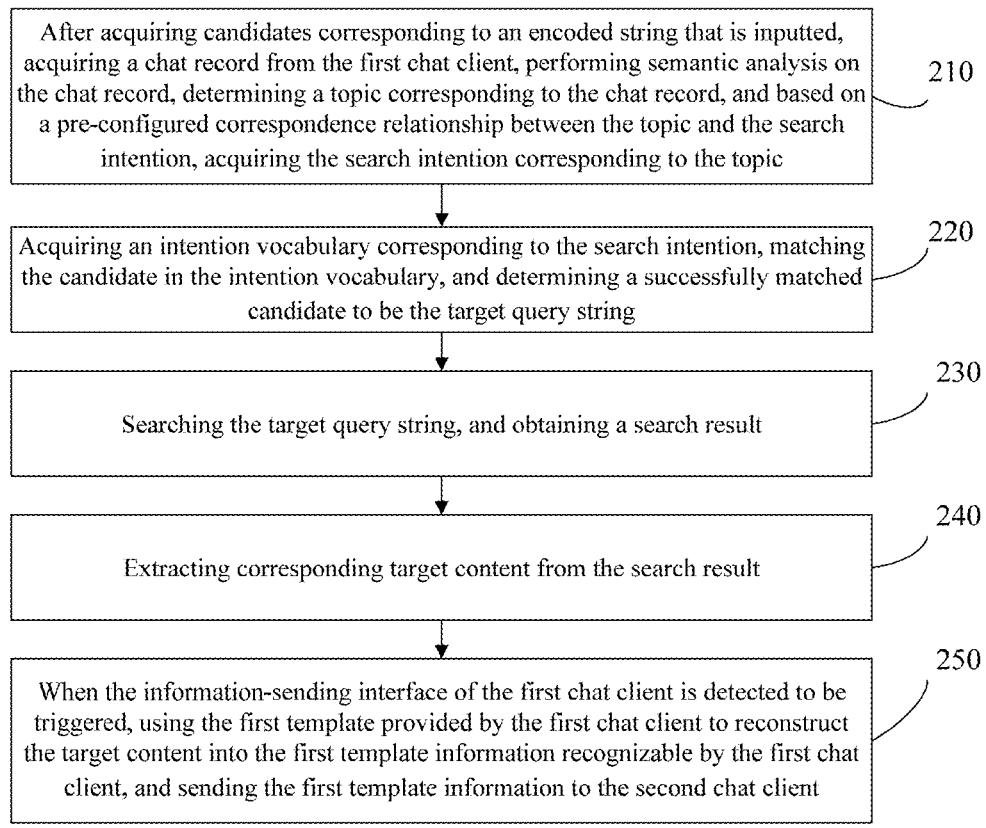
FIG. 2 illustrates a flow chart diagram of an information input method according to Embodiment 2 in embodiments of the present disclosure.

Referring to FIG. 2, FIG. 2 illustrates a flow chart diagram of an information input method according to Embodiment 2 in embodiments of the present disclosure.

In embodiment of the present disclosure, first, the search intention of the user may be analyzed based on the chat record of the first client, and a target query string may be determined from the candidates based on the search intention.

The disclosed information input method may specifically comprise:

Step 210, after acquiring candidates corresponding to an encoded string that is inputted, acquiring a chat record from the first chat client, performing semantic analysis on the chat record, determining a topic corresponding to the chat record, and based on a pre-configured correspondence relationship between the topic and a search intention, acquiring the search intention corresponding to the topic.

In specific implementation, the chat record in the first chat client may be a chat record between the first client and the second client within a threshold of sending times in the first chat client, such that the current search intention of the user may be ensured to be analyzed out. For example, when the threshold of sending times is 5, the chat record prior to the $5^{th}$ sending time of the user may be obtained.

In the disclosed embodiment, via topic-extracting methods in the dialogue system, the topic closest to the current moment of the user may be analyzed and extracted from the chat record. Further, based on the pre-configured correspondence relationship between the topic(s) and the search intention(s), the current search intention of the first client corresponding to the current topic may be determined. For the analyzing approach of the topics, the present disclosure is not intended to be limiting.

For example, when a first chat client chats with a second chat client, the user of the first chat client may be assumed to be user A, and the user of the second chat client may be assumed to be assumed to be user B. When the user A sends "wanna treat you to dinner tonight, do you have time?" in the first chat client to the second chat client, the user B may replied "aha, I do, what to eat?" Then, for the first chat client used by the user A, the present disclosure may perform natural language analysis on the chat record obtained in the first chat client, and the topic of the chat record may be determined to be a food-service topic. Further, based on the pre-configured correspondence relationship between the topic and the search intention, the obtained search intention corresponding to the food-service topic may be a food-service search intention. That is, the search intention obtained towards the first chat client (may also be understood as the user A) is the food-service search intention.

In specific implementation, when the user just starts the chat client and no chat record has been obtained, or the chat record is too short to recognize the search intention, the aforementioned process of performing semantic analysis on the chat record to obtain the search intention may not be executed. Or, the search intention may be determined by using a method described later in Embodiment 3.

Step 220, acquiring an intention vocabulary corresponding to the search intention, matching the candidate in the intention vocabulary, and determining a successfully matched candidate to be the target query string.

In the disclosed embodiments, for each search intention, an intention vocabulary corresponding to the search intention may be pre-configured. For example, for a food-service search intention, names of the restaurants and names of dishes, etc. may be saved in a corresponding intention vocabulary. Different search intentions may correspond to different intention vocabularies.

After determining the intention vocabulary, the candidate corresponding to the encoded string inputted by the user may be matched in the intention vocabulary, and a successfully matched candidate may be used as the target query string. For example, for the aforementioned food-service search intention, the intention vocabulary corresponding to the food-service search intention may be obtained. When the user inputs "quanjude", the obtained candidates may include "Quan Ju De", "Global", etc. The candidates may be matched in the intention vocabulary of the food-service search intention, and "Quan Ju De" may be determined to be the target query string.

It should be noted that, the intention vocabulary may be synchronized locally from the server to the input method after the search intention is determined. Or, the intention vocabulary of various search intentions may be downloaded to local storage in advance.

Optionally, after Step 220, the method further comprises:

Step 212, adding a preset search-triggering interface to the target query string, and displaying the search-triggering interface when the target query string is displayed; and when the triggering operation performed by the user on the search-triggering interface is determined to be received, Step 230 is jumped to.

As shown in FIG. 1A, after "Quan Ju De" is determined to be the target query string, a preset search-triggering interface may be added to the target query string, and the search-triggering interface may be displayed when the target query string is displayed. The shape of the search-triggering interface may be related to the search intention, and may vary as the search intention varies. For example, the corresponding button next to the display location of "Quan Ju De" in FIG. 1A may have a shape related to the food-service search intention. When the user clicks such button, the triggering operation performed by the user on the search-triggering interface is determined to be received, and Step 230 may be jumped to as the next step, such that the search process starts. If no triggering operation performed by the user on the search-triggering interface is determined to be received, no subsequent operation is performed.

Step 230, searching the target query string, and obtaining a search result.

In embodiments of the present disclosure, the target query string may be first searched in a search engine, and all initial search results related to the target query string may be obtained. Based on the previously determined search intention, a matching degree between each initial search result and the search intention is calculated, and initial search result(s) with a matching degree greater than a preset matching degree threshold may undergo subsequent processing.

Optionally, Step 230 may further comprise the following sub-steps:

Sub-step 232, based on the target query string and the corresponding search intention, acquiring a search result from a third-party website corresponding to the search intention.

In embodiments of the present disclosure, to improve the accuracy of searching, for each search intention, one or more vertical search websites of a corresponding type may be configured. For example, the food-service type may correspond to a consumer review website, and for food-service related information, the search result may be obtained from the consumer review website. In one example, for the aforementioned "Quan Ju De", the search result comprising information such as the location, price, and customer rating of each sub-store of "Quan Ju De" may be retrieved from the consumer review website.

Step 240, extracting corresponding target content from the search result.

In one embodiment, after the search result is obtained, the search result may be organized and analyzed to obtain structural information, and each property in the structural information may be used as the target content after undergoing word section extraction and sorting. Currently, in other embodiments, the search result in the form of the structural information may be obtained directly from a third party website. In the present step, critical word section in the structural information may be extracted, for example, the name and star rating of each sub-store of "Quan Ju De", and the distance from each sub-store of "Quan Ju De" to the user's current location may be used as the target content.

Optionally, after Step 240, the method further comprises:

Step 242, using the second template provided by the current input method program to reconstruct the target content into the second template information comprising the sending interface that is recognizable by the input method program, and displaying the second template information in the current input method interface; and when the triggering operation performed by the user on the sending interface is determined to be received, sub-step 252 is the next step.

The result after the target content is reconstructed into the second template information is illustrated in FIG. 1B.

Optionally, the second template information may further include one or more search items. After Step 242, the method further comprises:

Step 244, after a triggering operation on a certain search item in the second template information is received, acquiring the detailed information of search item as the target content, and returning to execute Step 242.

For example, as shown in FIG. 1B, after the second template information is displayed and the clicking operation by a user on a certain search item in the second template information is received, the detailed information of the search item may be obtained. The detailed information of the search item may be used as the target content, and the second template provided by the current input method program may be once again used to reconstruct the target content into the second template information recognizable by the input method program. Further, the second template information may be displayed in the current input method interface, as illustrated in FIG. 1C.

When the triggering operation performed by the user on the sending interface is determined to be received, sub-step 252 is jumped to.

Step 250, when the information-sending interface of the first chat client is detected to be triggered, using the first template provided by the first chat client to reconstruct the target content into the first template information recognizable by the first chat client, and sending the first template information to the second chat client.

After the target content is acquired, based on the first template provided by the first chat client, the target content may be reconstructed into the first template information.

Optionally, based on Step 242, when the triggering operation performed by the user on the sending interface in the second template information, Step 250 may comprise:

Sub-step 252, using the first template provided by the first chat client to reconstruct the second template information in real-time to obtain the first template information, and sending the first template information to the second chat client.

For example, when the user clicks "sending to a receiver" in FIG. 1B, the first template provided by the first chat client may be used to reconstruct the second template information in real-time. The obtained first template information may be sent to the second chat client, and the result shown in FIG. 1D is obtained.

Steps and principles of the disclosed embodiment is similar to that of Embodiment 1, which are not described in detail herein.

In the present disclosure, when the user uses the input method in the first chat client, a search intention may exist. For example, when the chat client A chats with the chat client B, the user A may mention an idea to watch a movie, and have search intentions such as the movies now playing, the show time, and the ticket price, etc. Accordingly, the present disclosure may, under direct control of the input method, recognize that the search intention of the user A is a film performance search intention, and the target query string corresponding to the search intention may be determined to be movie. Thus, the server may, based on the intention and target query string, obtain the search result such as the corresponding movie, show time, and ticket price. The search result may be reconstructed into template information recognizable by the client B, and the template information may be sent to the client B for display. Thus, for the user of the chat client A:

First, because the input method stays in a chat client currently used by the user, the user does not need to leave the chat interface of the chat client to perform a search process in other software. Thus, the continuous chat process of the user may be ensured, and no additional switching operation is needed.

Further, in the input process, because no addition switching operation is performed by the user, the switching cost is nearly zero.

Further, the user is not required to perform complicated copy/paste, screenshot, or process-sharing in order to send the search result to the chat partner, and precise and concise target content may be sorted out from the search result automatically. Further, the target content may be reconstructed and arranged in a form suitable for reading in the second chat client for sending to the second chat client. Thus, the content may be more suitable for reading by the chat partner, and the communication cost may be reduced.

Further, with respect to pure word input of the input method, the disclosed input information may have enhanced richness.

Embodiment 3

Figure 3:
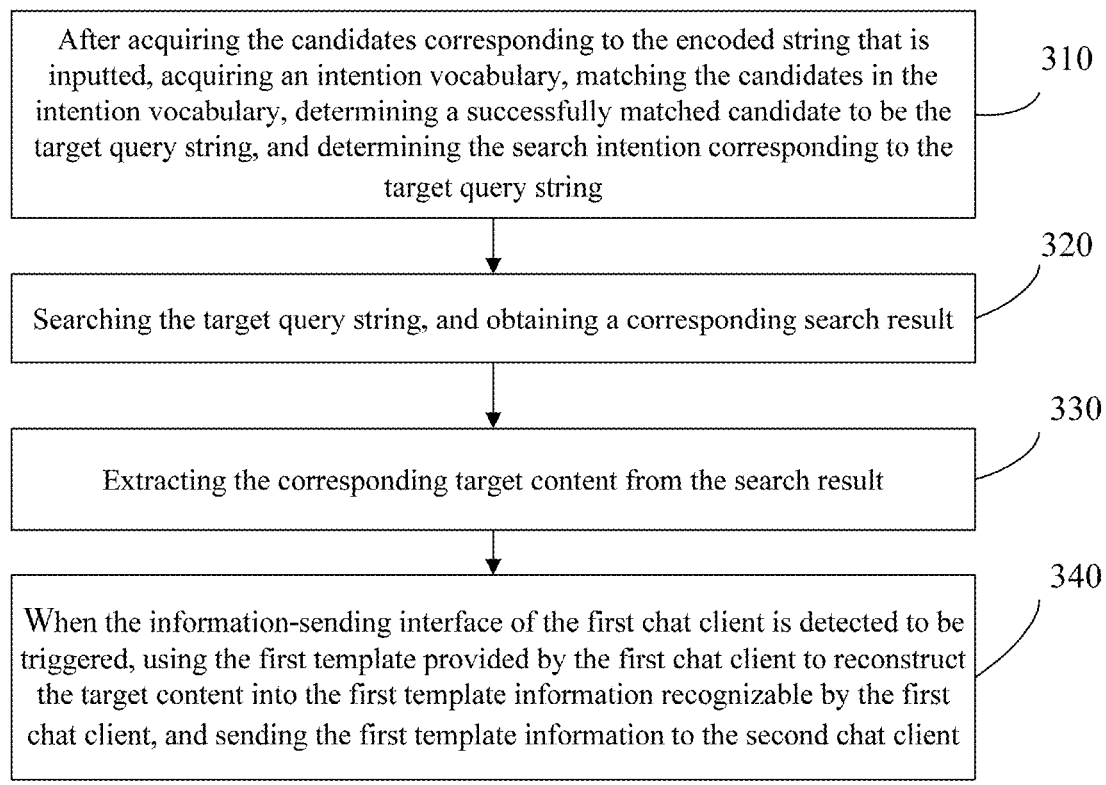
FIG. 3 illustrates a flow chart diagram of an information input method according to Embodiment 3 in embodiments of the present disclosure.

Referring to FIG. 3, a flow chart diagram of an information input method according to Embodiment 3 in embodiments of the present disclosure is illustrated.

In embodiments of the present disclosure, when the user uses the first chat client, in a process where the input method is triggered to perform input at any moment, the specific candidate(s) for use as the target query string may be determined actively. Further, the search intention corresponding to each target query string may be determined, thereby performing processes of precise searching and content sending.

The aforementioned information input method may specifically include:

Step 310, after acquiring the candidates corresponding to the encoded string that is inputted, acquiring an intention vocabulary, matching the candidates in the intention vocabulary, determining a successfully matched candidate to be the target query string, and determining the search intention corresponding to the target query string.

After the user opens the chat interface of the first chat client and starts the input method program, the input method program may, based on the encoded string that is inputted by the user, obtain the corresponding candidates and display the candidates.

For such candidates, the present disclosure may directly obtain the pre-configured intention vocabulary, where each intention vocabulary corresponds to one search intention.

Further, words in each intention vocabulary may be matched with the candidate. If the matching is successful, the candidate may be used as the target query string, and based on the search intention that the intention vocabulary belongs to, the search intention corresponding to the target query string is determined.

In practice, if a plurality of candidates are matched with one intention vocabulary, the candidate matched with the intention vocabulary that is ranked topmost may be used as the target query string.

Obviously, in embodiments of the present disclosure, optionally, the first candidate may be used as the target query string, and existence of the first candidate in each intention vocabulary may be searched. If no intention vocabulary is matched, the first candidate is no longer used as the target query string, and the next candidate may be selected as the target query string for matching in each intention vocabulary. If a certain intention vocabulary is matched, the search intention corresponding to the intention vocabulary may be labeled as the search intention of the target query string, and so on.

Optionally, determining the search intention corresponding to the target query string comprises:

Sub-step S312, when the target query string only matches one intention vocabulary, the search intention corresponding to the one matched intention vocabulary is determined to be the search intention corresponding to the target query string; and Sub-step S314, when the target query string matches at least two intention vocabularies, acquiring the chat record from the first chat client, performing sematic analysis on the chat record, and determining a topic corresponding to the chat record; based on a pre-configured correspondence relationship between the topic and the search intention, acquiring the search intention corresponding to the topic as the search intention corresponding to the target query string.

In specific implementation, when matching a certain candidate with each intention vocabulary, a single intention vocabulary may be matched, or at least two intention vocabularies may be matched. When the target query string only matches one intention vocabulary, the search intention corresponding to the intention vocabulary may be directly determined to be the search intention corresponding to the target query string.

When the candidate matches a plurality of intention vocabularies, which intention vocabulary better suits the search intention of the first chat client may need to be further determined. The present disclosure may obtain the current search intention with reference to the chat record. More specifically, semantic analysis may be performed based on the chat record of the first chat client, and the topic corresponding to the chat record may be determined; based on the pre-configured correspondence relationship between the topic and the search intention, the search intention corresponding to the topic may be obtained.

More specifically, in embodiments of the present disclosure, via various topic-extracting methods in the dialogue system, the topic closest to the current moment of the user may be analyzed and extracted from the chat record, and based on the pre-configured correspondence relationship between the topic and the search intention, the current search intention of the first client corresponding to the current topic may be determined. For the analyzing method of the topic, the present disclosure is not intended to be limiting.

In an optional embodiment, the chat record in the first chat client may be a chat record between the first client and the second client within a threshold of sending times in the first chat client, such that the current search intention of the user may be ensured to be analyzed out. For example, when the threshold of sending times is 5, the chat record prior to the $5^{th}$ sending number of the user may be obtained.

Step 320, searching the target query string, and obtaining a corresponding search result.

Optionally, Step 320 may further comprise:

Sub-step 3202, based on the target query string and the corresponding search intention, obtaining a search result from a third-party website corresponding to the search intention.

In Step 330, the corresponding target content is extracted from the search result.

Optionally, after the Step 330, the method further comprises:

Step 332, using the second template provided by the current input method program to reconstruct the target content into the second template information comprising the sending interface that is recognizable by the input method program, and displaying the second template information in the current input method interface; and when the triggering operation performed by the user on the sending interface is determined to be received, sub-step 342 is jumped to.

Optionally, the second template information may further include one or more search items. After Step 332, the method further comprises:

Step 334, after receiving a clicking operation performed by the user on a certain search item in the second template information, acquiring the detailed information of the search item as the target content, and returning to execute Step 332.

Step 340, when the information-sending interface of the first chat client is detected to be triggered, using the first template provided by the first chat client to reconstruct the target content into the first template information recognizable by the first chat client, and sending the first template information to the second chat client.

Optionally, based on Step 332, when the triggering operation performed by the user on the sending interface in the second template information is determined to be received, Step 340 may comprise:

Sub-step 342, using the first template provided by the first chat client to reconstruct the second template information in real-time into the first template information, and sending the first template information to the second chat client.

In specific implementation, when the user executes the triggering operation on the sending interface in the second template information, the second template information may be directly converted into the first template information recognizable by the first chat client or the second chat client. Further, the first template information may be sent to the second chat client.

Further, embodiments of the present disclosure may perform real-time analysis and extraction of each property in the second template information, and the content and form inappropriate for display in the layout of the chat session may be deleted. For example, the distance from each sub-store of "Quan Ju De" to the current location may be deleted, and the rating of each store may have a changed display form, thereby obtaining the first template information.

Steps and principles of the disclosed embodiment is similar to that of Embodiment 1 and Embodiment 2, which are not described in detail herein.

In embodiments of the present disclosure, when the user uses the input method in the first chat client, a search intention may exist. For example, when the client A chats with the client B, the user A may mention an idea to watch a movie, and have search intentions such as the movies now playing, the show time, and the ticket price, etc. Accordingly, the present disclosure may, under direct control of input method, recognize that the search intention of the user A is the film performance search intention, and the target query string corresponding to the search intention may be determined to be movie. Thus, the server may, based on the intention and target query string, obtain the search result such as the corresponding movie, show time, and ticket price. The search result may be reconstructed into template information recognizable by the client B, and the template information may be sent to the client B for display. Thus, for the user of the chat client A:

First, because the input method stays in a chat client currently used by the user, the user does not need to leave the chat interface of the chat client to perform a search process in other software. Thus, the continuous chat process of the user may be ensured, and no additional switching operation is needed.

Further, in the input process, because no addition switching operation is performed by the user, the switching cost is nearly zero.

Further, the user is not required to perform complicated copy/paste, screenshot, or process-sharing in order to send the search result to the chat partner, and precise and concise target content may be sorted out from the search result automatically. Further, the target content may be reconstructed and arranged in a form suitable for reading in the second chat client before being sent to the second chat client. Thus, the content may be more suitable for reading by the chat partner, and the communication cost may be reduced.

Further, with respect to pure word input of the input method, the disclosed input information may have enhanced richness.

Embodiment 4

The disclosed embodiment is based on Embodiment 2, and is an example of performing search intention analysis and search result processing via the server.

Figure 4:
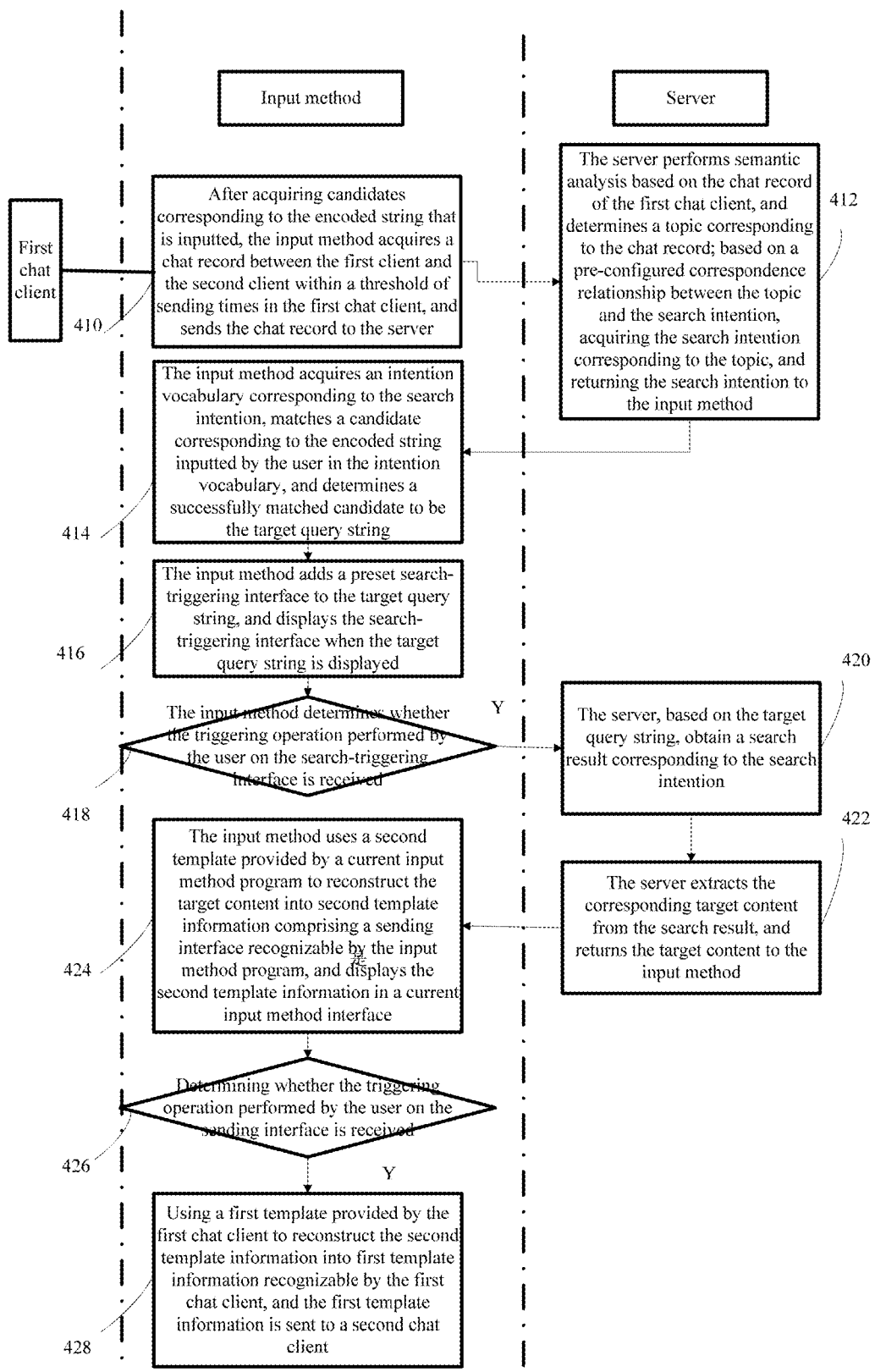
FIG. 4 illustrates a flow chart diagram of an information input method according to Embodiment 4 in embodiments of the present disclosure.

Referring to FIG. 4, a flow diagram of an information input method according Embodiment 4 in embodiments of the present disclosure is illustrated.

Step 410, after acquiring candidates corresponding to the encoded string that is inputted, the input method acquires a chat record between the first client and the second client within a threshold of sending times in the first chat client, and sends the chat record to the server.

In embodiments of the present disclosure, after each time the user starts the first chat client, the input method may record the number of times that information is sent by the first chat client, and the chat record sent to the server may be restricted to a certain scope.

After acquiring the chat record between the first client and the second client, the disclosed input method may send the chat record to the server, and the server may analyze the search intention of the first client.

Step 412, the server performs semantic analysis based on the chat record of the first chat client, and determines a topic corresponding to the chat record; based on a pre-configured correspondence relationship between the topic and the search intention, acquiring the search intention corresponding to the topic, and returning the search intention to the input method.

After receiving the chat record of the first chat client sent by the input method corresponding to the first chat client, the server may perform semantic analysis based on the chat record of the first chat client, and determine the topic corresponding to the chat record. Based on the pre-configured correspondence relationship between the topic and the search intention, the search intention corresponding to the topic may be obtained, and the search intention may be returned to the input method.

In Step 414, the input method acquires an intention vocabulary corresponding to the search intention, matches a candidate corresponding to the encoded string inputted by the user in the intention vocabulary, and determines a successfully matched candidate to be the target query string.

After receiving the search intention returned by the server, the input method may obtain the intention vocabulary corresponding to the search intention based on the pre-configured correspondence relationship between the search intention and the intention vocabulary. Further, the candidate corresponding to the encoded string may be matched in the intention vocabulary, and when the matching is successful, a successfully matched candidate may be used as the target query string.

In Step 416, the input method adds a preset search-triggering interface to the target query string, and displays the search-triggering interface when the target query string is displayed.

In Step 418, the input method determines whether the triggering operation performed by the user on the search-triggering interface is received. When the triggering operation performed by the user on the search-triggering interface is determined to be received, Step 420 is the next step. When no triggering operation performed by the user on the search-triggering interface is determined to be received, no subsequent operation is performed.

As shown in FIG. 1A, when the clicking operation directed towards the button next to the "Quan Ju De" is detected, "Quan Ju De" may be sent to the server. Obviously, under situations where the server does not record the aforementioned search intention, the input method may also send the search intention to the server.

In Step 420, the server, based on the target query string, obtain a search result corresponding to the search intention.

It should be noted that, if the server in Step 420 is a search server, then in Step 420, the search result corresponding to the target query string may be obtained from the server. If the server in Step 420 is not a search server, the server may send the target query string to the search server. After obtaining initial search results from the search server, the search result related to the search intention may be filtered from the initial search results.

In Step 422, the server extracts the corresponding target content from the search result, and returns the target content to the input method.

Optionally, after the server extracts the corresponding target content from the search result, the method further comprises:

Sub-step S423, organizing the target content into data in an xml format.

The server may return the data in the xml format that is organized from the target content to the input method, where xml (extensible markup language) is a lightweight data storage file, such that data exchange between different systems in different operation systems is facilitated. The present disclosure may extract the property information corresponding to the search intention from the search result, and organize the property information into target content in the xml format.

In embodiments of the present disclosure, corresponding to each search intention, a corresponding xml template may be configured, and the extracted property information may just need to be filled in a corresponding xml template. For example, based on the food-service search intention of the user and the target query string of Quan Ju De, each search item of Quan Ju De such as the structural search items of "Quan Ju De (Qianmen sub-store)" and "Quan Ju De (Tsinghua campus sub-store)" may be obtained from the consumer review website. Property information such as "store name", "average cost", "star rating" may be extracted from the structural search items to be the target content. Further, by using the corresponding xml template of the food-service search intention, the aforementioned information may be filled in the xml template to generate the target content in the xml format, and the target content may be provided to the input method client.

For example, the codes of the target content in the xml format may be as follows:

```
xml:
<?xml version="1.0" encoding="ISO-8859-1"?>
<!-- Edited with XML Spy v2007 (http://www.altova.com) -->
<res>
    <stitle> sub-stores of Quan Ju De in the Beijing region </stitle>
    <a>
        <title> Quan Ju De (Tsinghua campus sub-store)</title>
        <star>4.0 score</star>
        <avg>50</avg>
    </a>
    <a>
        <title> Quan Ju De (Olympic village sub-store)</title>
        <star>4.0分 </star>
        <avg>50</avg>
    </a>
    <a>
        <title> Quan Ju De (Qianmen sub-store)</title>
        <star>4.0分 </star>
        <avg>50</avg>
    </a>
    <a>
        <title> Quan Ju De (Wangfujing sub-store)</title>
        <star>4.0分 </star>
        <avg>50</avg>
    </a>
</res>
```

In Step 424, the input method uses a second template provided by a current input method program to reconstruct the target content into second template information comprising a sending interface recognizable by the input method program, and displays the second template information in a current input method interface.

Directed towards the aforementioned target content in the xml format, an xslt template to be displayed in the input method interface may be pre-configured in the input method client, and different search intentions may correspond to different xslt templates. After receiving the target content, a corresponding xslt template may be selected based on the search intention, and the target content in the xml format may be converted to an html page to be displayed in the input method interface.

In embodiments of the present disclosure, the xslt template may be, for example, as follows:

```
xsl:
<?xml version="1.0" encoding="ISO-8859-1"?>
<!-- Edited with XML Spy v2007 (http://www.altova.com) -->
<xsl:stylesheet version="1.0"
xmlns:xsl="http://www.w3.org/1999/XSL/Transform">
<xsl:output method='html' version='1.0' encoding='UTF-8'
indent='yes'/>
<xsl:template match="/">
<html>
<body>
<h2><xsl:value-of select="res/stitle"/></h2>
<table border="1">
<tr bgcolor="#9acd32">
<th align="left"> store name </th>
<th align="left"> rating </th>
<th align="left"> average cost </th>
</tr>
<xsl:for-each select="res/a">
<tr>
<td><xsl:value-of select="title"/></td>
<td><xsl:value-of select="star"/></td>
<td> ¥ <xsl:value-of select="avg"/></td>
</tr>
</xsl:for-each>
</table>
</body>
</html>
</xsl:template>
</xsl:stylesheet>
```

In Step 426, whether the triggering operation performed by the user on the sending interface is received is determined. When the triggering operation performed by the user on the sending interface is determined to be received, Step 428 is the next step. When no triggering operation performed by the user on the search-triggering interface is determined to be received, no subsequent operation is performed.

When the sending interface in the second template is triggered, the information-sending interface of the first chat client may be further triggered, such that Step 428 is executed.

In Step 428, a first template provided by the first chat client is used to reconstruct the second template information into first template information recognizable by the first chat client, and the first template information is sent to a second chat client.

In embodiments of the present disclosure, for the second template information, the xslt template for the second chat client may be utilized to extract the structural property information from the second template information, and the extracted structural property information may be reconstructed into the first template information. Further, by using the information-sending interface of the first chat client, the first template information is sent to the second chat client.

Obviously, the present disclosure may not perform processing on the displayed second template information, but may reconstruct the first template information directly from the target content in the xml format. That is, after the triggering operation performed by the user on the sending interface is received, by using the xslt template directed towards the second client, the target content in the xml format may be reconstructed into a template recognizable by the second chat client. The information-sending interface of the first chat client may be invoked, and the template information may be sent to the second chat client.

Embodiments of the present disclosure may perform semantic analysis on the chat record, and obtain and filter the search results for execution in the server, such that the resource consumption of the terminal device may be reduced and the impact on the performance of the terminal may be avoided.

Embodiment 5

Figure 5:
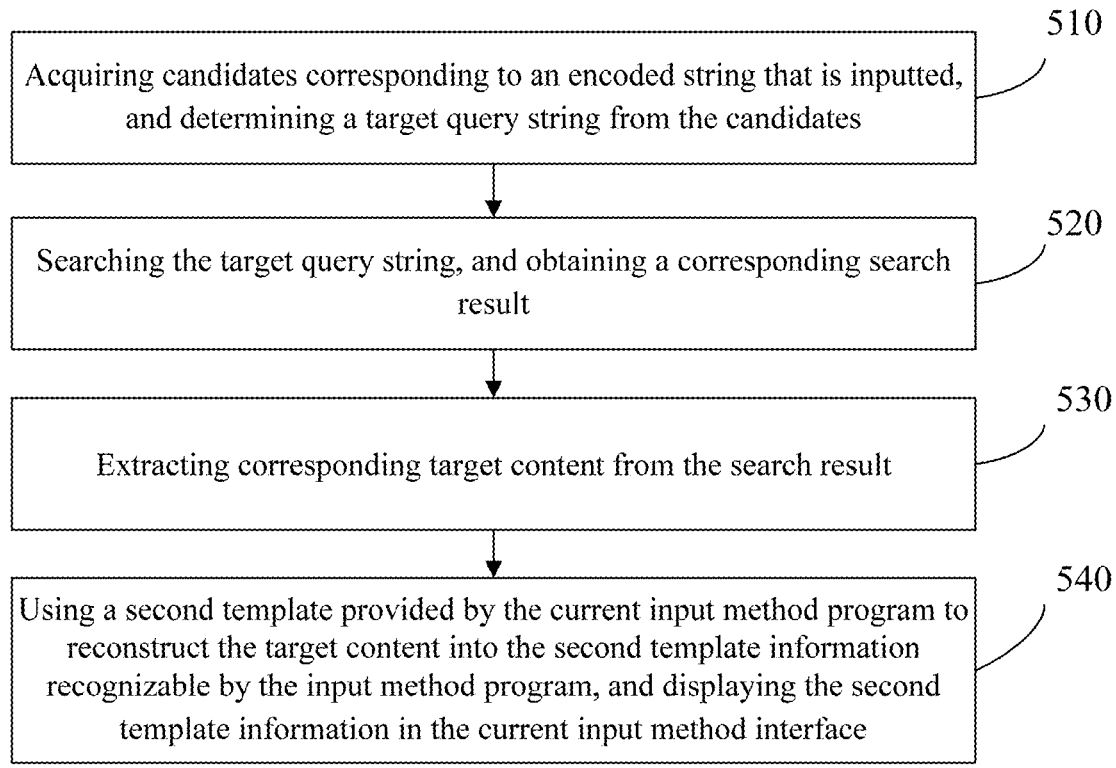
FIG. 5 illustrates a flow chart diagram of an information input method according to Embodiment 5 in embodiments of the present disclosure.

Referring to FIG. 5, a flow chart diagram of an information input method according to Embodiment 5 in embodiments of the present disclosure is provided. The method may specifically comprise:

Step 510, acquiring candidates corresponding to an encoded string that is inputted, and determining a target query string from the candidates;

Step 520, searching the target query string, and obtaining a corresponding search result;

Step 530, extracting corresponding target content from the search result; and

Step 540, using a second template provided by the current input method program to reconstruct the target content into the second template information recognizable by the input method program, and displaying the second template information in the current input method interface.

In an optional embodiment of the present disclosure, the second template information includes a sending interface. The method further includes: reconstructing the second template information into the first template information recognizable by the first chat client and sending the first template information to the second chat client.

In an optional embodiment of the present disclosure, the second template information may further include one or more search items. After Step 540, the method further comprises:

after receiving the triggering operation on a certain search item in the second template information, acquiring the detailed information of the search item as the target content, and returning to execute Step 540.

In an optional embodiment of the present disclosure, Step 510 comprises:

acquiring candidates corresponding to an encoded string that is inputted;

acquiring a chat record from a first chat client;

performing semantic analysis on the chat record, and determining a topic corresponding to the chat record;

based on a pre-configured correspondence relationship between the topic and search intention, acquiring a search intention corresponding to the topic;

acquiring an intention vocabulary corresponding to the search intention; and matching the candidates in the intention vocabulary, and determining a successfully matched candidate as the target query string.

In an optional embodiment of the present disclosure, Step 510 comprises:

acquiring candidates corresponding to the encoded string that is inputted;

acquiring an intention vocabulary; and matching the candidates in the intention vocabulary, and determining a successfully matched candidate as the target query string.

In an optional embodiment of the present disclosure, after Step 510, the method further comprises:

determining a search intention corresponding to the target query string.

In an optional embodiment of the present disclosure, each intention vocabulary may correspond to one search intention, and the step of determining the search intention corresponding to the target query string comprises:

when the target query string only matches one intention vocabulary, the search intention corresponding to the intention vocabulary that is matched is determined to be the search intention corresponding to the target query string; and when the target query string matches at least two intention vocabularies, the chat record is obtained from the first chat client, the sematic analysis is performed on the chat record, and the topic corresponding to the chat record is determined; based on the pre-configured correspondence relationship between the topic and the search intention, the search intention corresponding to the topic is obtained as the search intention corresponding to the target query string.

In an optional embodiment of the present disclosure, after Step 510, the method further comprises:

adding a preset search-triggering interface to the target query string, and displaying the search-triggering interface when the target query string is displayed; and when the triggering operation performed by the user on the search-triggering interface is received, Step 520 is executed.

Embodiment 6

Figure 6:
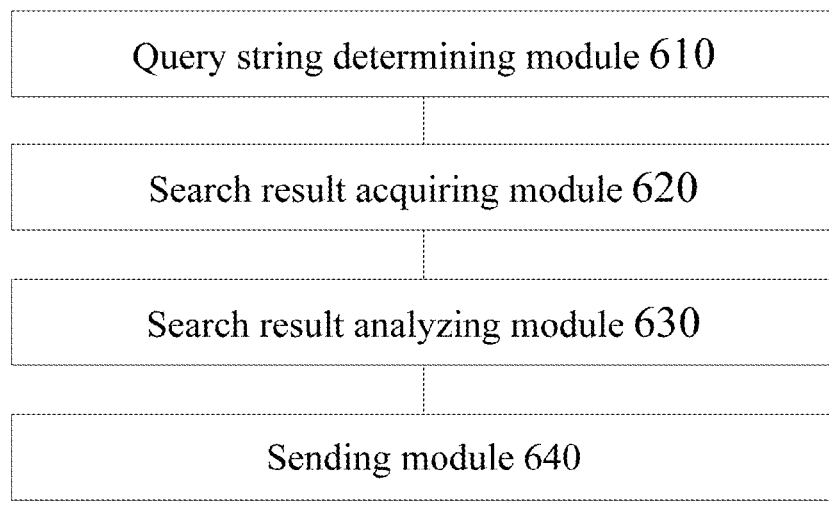
FIG. 6 illustrates a structural schematic view of an information input device according to embodiments of the present disclosure.

Referring to FIG. 6, a structural schematic view of an information input device according to embodiments of the present disclosure. The method specifically comprises:

a query string determining module 610, configured to acquire candidates corresponding to an encoded string that is inputted, and determine a target query string from the candidates;

a search result acquiring module 620, configured to search the target query string and obtain a corresponding search result;

a search result analyzing module 630, configured to extract corresponding target content from the search result; and a sending module 640 configured to, when an information-ending interface of a first chat client is detected to be triggered, use a first template provided by the first chat client to reconstruct the target content into first template information recognizable by the first chat client, and send the first template information to a second chat client.

Optionally, the query string determining module comprises:

a first intention analyzing module configured to, after acquiring the candidates corresponding to the encoded string that is inputted, acquiring a chat record from the first chat client; perform sematic analysis on the chat record, and determine a topic corresponding to the chat record; and based on a pre-configured correspondence relationship between the topic and the search intention, acquire a search intention corresponding to the topic.

a query string determining module, configured to acquire an intention vocabulary corresponding to the search intention, match the candidates in the intention vocabulary, and determine a successfully matched candidate as the target query string.

Optionally, the query string determining module comprises:

A second intention analyzing module configured to, after acquiring the candidates corresponding to the encoded string that is inputted, acquire the intention vocabulary, match the candidates in the intention vocabulary, and determine a successfully matched candidate as the target query string.

Optionally, the second intention analyzing module is further configured to determine the search intention corresponding to the target query string.

Optionally, each intention vocabulary corresponds to one search intention. The second intention analyzing module comprises:

a first intention determining module configured to, when the target query string matches only one intention vocabulary, determine the search intention corresponding to the successfully matched intention vocabulary as the search intention corresponding to the target query string; and a second intention determining module configured to, when the target query string matches at least two intention vocabularies, obtain the chat record from the first chat client, perform the sematic analysis on the chat record, and determine the topic corresponding to the chat record; and based on the pre-configured correspondence relationship between the topic and the search intention, obtain the search intention corresponding to the topic as the search intention corresponding to the target query string.

Optionally, other than the query string determining module, the device further comprises:

a search-triggering display module, configured to add a preset search-triggering interface to the target query string, and display the search-triggering interface when the target query string is displayed; and when the triggering operation performed by the user on the search-triggering interface is determined to be received, invoke the search result acquiring module.

Optionally, other than the search result analyzing module, the device further comprises;

a content displaying module, configured to use a second template provided by a current input method program to reconstruct the target content into second template information recognizable by the input method program, and display the second template information in a current input method interface. The second template information comprises a sending interface.

Optionally, the sending module comprises:

a first sending module configured to, when the triggering operation performed by the user on the sending interface is detected, use a first template provided by the first chat client to reconstruct the second template information into first template information recognizable by the first chat client, and send the first template information to a second chat client.

Optionally, the second template information further includes one or more search items. Other than the content displaying module, the device further comprises:

a secondary displaying module configured to, after the triggering operation on a certain search item in the second template information is received, acquire the detailed information of the search item as the target content and invoke the content displaying module.

Further, the first intention analyzing module or the second intention determining module is in the server.

Optionally, the first intention analyzing module comprises:

a chat record acquiring module, configured to acquire the chat record between the first client and the second client within a threshold of sending times in the first chat client; and a chat record sending module configured to, in the first chat client, send the chat record between the first chat client and the second chat client to the server.

Embodiment 7

Figure 7:
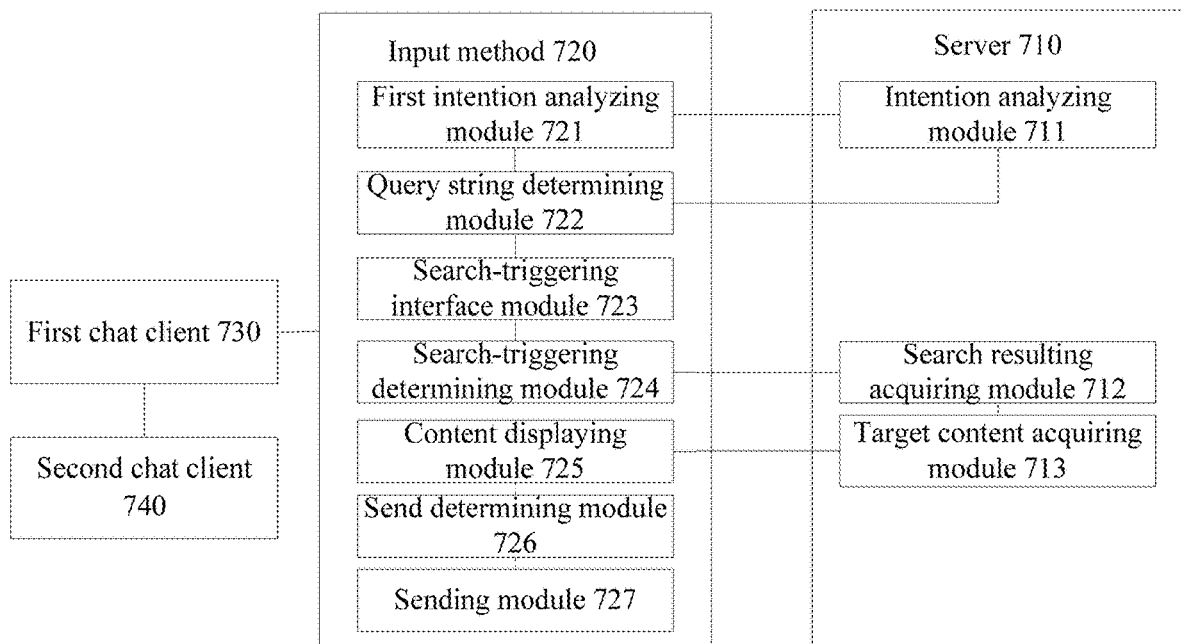
FIG. 7 illustrates a structural schematic view of an information input system according to embodiments of the present disclosure.

Referring to FIG. 7, a structural schematic view of an information input system according to embodiments of the present disclosure is illustrated. The system may specifically include:

a server 710, an input method client 720, a first chat client 730, and a second chat client 740.

The input method client 720 includes:

a first intention analyzing module 721 configured to, after acquiring the candidates corresponding to the encoded string that is inputted, send the chat record between the first chat client and the second chat client that is in the first chat client to the server;

a query string determining module 722, configured to receive the search intention that is returned from the server based on the chat record, acquire an intention vocabulary corresponding to the search intention, match the candidates in the intention vocabulary, and determine a successfully matched candidate to be the target query string;

a search-triggering interface module 723, configured to add a preset search-triggering interface to the target query string, and display the search-triggering interface when the target query string is displayed;

a search-triggering determining module 724, configured to determine whether the triggering operation performed by the user on the search-triggering interface is received; when the triggering operation performed by the user on the search-triggering interface is determined to be received, send the target query string to the server; and when no triggering operation performed by the user on the search-triggering interface is determined to be received, perform no subsequent operation;

a content displaying module 725, configured to use a second template provided by a current input method program to reconstruct the target content into second template information recognizable by the input method program, and display the second template information in a current input method interface, where the second template information comprises a sending interface;

a send determining module 726, configured to determine whether the triggering operation performed by the user on the sending interface is received; when the triggering operation performed by the user on the sending interface is determined to be received, the sending module 727 is used; and when no triggering operation performed by the user on the search-triggering interface is determined to be received, no subsequent operation is performed.

A sending module 727, configured to use a first template provided by the first chat client to reconstruct the target content into first template information recognizable by the first chat client, and send the first template information to a second chat client.

The server 710 comprises:

an intention analyzing module 711, configured to receive the chat record sent by the input method client, perform semantic analysis on the chat record, and determine the topic corresponding to the chat record; based on a pre-configured correspondence relationship between the topic and the search intention, acquire the search intention corresponding to the topic, and return the search intention to the input method client;

a search result acquiring module 712, configured to search the target query string, and acquire a search result corresponding to the search intention; and a target content acquiring module 713, configured to extract the corresponding target content from the search result, and return the target content to the input method client.

Embodiment 8

Figure 8:
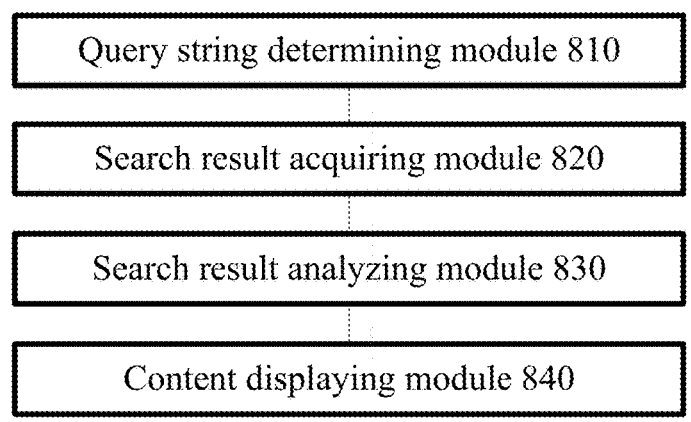
FIG. 8 illustrates a structural schematic view of another information input device according to embodiments of the present disclosure.

Referring to FIG. 8, a structural schematic view of an information input device according to embodiments of the present disclosure is provided. The device may specifically comprise:

a query string determining module 810, configured to acquire candidates corresponding to an encoded string that is inputted, and determine a target query string from the candidates;

a search result acquiring module 820, configured to search the target query string and obtain a corresponding search result;

a search result analyzing module 830, configured to extract corresponding target content from the search result; and a content displaying module 840 configured to, use a second template provided by a current input method program to reconstruct the target content into second template information recognizable by the input method program, and display the second template information in a current input method interface.

In an optional embodiment of the present disclosure, the second template information comprises a sending interface, and the device further includes:

a sending module, configured to, when the sending interface is detected to be triggered, invoke a first template provided by the first chat client to reconstruct the second template information into first template information recognizable by the first chat client, and send the first template information to a second chat client.

In an optional embodiment of the present disclosure, the second template information further includes one or more search items. The device may further include:

a secondary displaying module configured to, after receiving the triggering operation on a certain search item in the second template information, acquire the detailed information of the search item as the target content and invoke the content displaying module.

Optionally, the query string determining module comprises:

a first intention analyzing module configured to, after acquiring the candidates corresponding to the encoded string that is inputted, acquire a chat record from the first chat client, perform semantic analysis on the chat record, determine a topic corresponding to the chat record, and based on a pre-configured correspondence relationship between the topic and the search intention, acquire the search intention corresponding to the topic;

a query string determining module, configured to acquire an intention vocabulary corresponding to the search intention, match the candidates in the intention vocabulary, and determine a successfully matched candidate to be the target query string.

Optionally, the query string determining module comprises:

a second intention analyzing module configured to, after acquiring the candidates corresponding to the encoded string that is inputted, acquire the intention vocabulary, match the candidates in the intention vocabulary, and determine a successfully matched candidate as the target query string.

Optionally, the second intention analyzing module is further configured to determine the search intention corresponding to the target query string.

Optionally, each intention vocabulary corresponds to one search intention. The second intention analyzing module comprises:

a first intention determining module, configured to when the target query string matches only one intention vocabulary, determine the search intention corresponding to the intention vocabulary that is matched as the search intention corresponding to the target query string; and a second intention determining module, configured to when the target query string matches at least two intention vocabularies, obtain the chat record from the first chat client, perform the sematic analysis on the chat record, and determine the topic corresponding to the chat record; based on the pre-configured correspondence relationship between the topic and the search intention, obtain the search intention corresponding to the topic as the search intention corresponding to the target query string.

Optionally, other than the query string determining module, the system further comprises:

a search-triggering display module, configured to add a preset search-triggering interface to the target query string, and display the search-triggering interface when the target query string is displayed; and when the triggering operation performed by the user on the search-triggering interface is determined to be received, invoke the search result acquiring module.

Optionally, the first intention analyzing module or the second intention determining module is in the server.

Optionally, the first intention analyzing module comprises:

a chat record acquiring module, configured to acquire the chat record between the first client and the second client within a threshold of sending times in the first chat client; and a chat record sending module configured to, in the first chat client, send the chat record between the first chat client and the second chat client to the server.

The present disclosure further discloses a computer-readable recording medium for storing a program that is configured to execute the aforementioned method embodiments.

The computer-readable recording medium comprises any mechanism configured to store or send information in a machine (e.g., a computer) readable form. For example, the machine readable medium comprises a read-only memory (ROM), a random-accessible memory (RAM), a magnetic storage medium, an optical storage medium, a flash storage memory, and propagation signals (e.g., carrier wave, infrared signal, digital signal, etc.) in electrical, light, sonic or other forms.

Further, those skilled in the relevant art may understand that, though some embodiments described herein comprise certain characteristics instead of other characteristics, combination of characteristics of different embodiments indicates that different embodiments may be formed within the scope of the present disclosure. For example, in the appended claims, the embodiments seeking for protection may be used in any combination form.

What is claimed is:
1. An information input method, comprising:
executing, by a terminal, an input method program in a first chat client;
displaying a graphical user interface of the input method program on a same screen as the first chat client;

acquiring, by the input method program, candidates corresponding to an encoded string that is inputted, and determining a target query string from the candidates;

searching, by the input method program, the target query string, and obtaining a corresponding search result;

extracting a first target content from the corresponding search result;

displaying, by the input method program, a second template in the graphical user interface of the input method program without leaving the screen of the first chat client, the second template including the first target content and a send button; and upon detecting the send button of the first chat client being triggered, formulating the first target content into second target content in a first template recognizable by the first chat client, the second target content being different than the first target content, and sending the second target content in the first template to a second chat client.

2. The method according to claim 1, wherein a step of acquiring candidates corresponding to an encoded string that is inputted, and determining a target query string from the candidates comprises:

acquiring the candidates corresponding to the encoded string that is inputted, acquiring a chat record from the first chat client, performing semantic analysis on the chat record, and determining a topic corresponding to the chat record, based on a pre-configured correspondence relationship between the topic and a search intention, acquiring the search intention corresponding to the topic;

acquiring an intention vocabulary corresponding to the search intention; and matching the candidates in the intention vocabulary, and determining a successfully matched candidate as the target query string.

3. The method according to claim 1, further comprising:

acquiring the candidates corresponding to the encoded string that is inputted;

acquiring an intention vocabulary;

matching the candidates in the intention vocabulary, and determining a successfully matched candidate as the target query string; and after matching the candidates in the intention vocabulary, and after determining the successfully matched candidate as the target query string, determining a search intention corresponding to the target query string.

4. The method according to claim 3, wherein each intention vocabulary corresponds to one search intention, and a step of determining a search intention corresponding to the target query string comprises:

when the target query string matches one intention vocabulary, determining the search intention corresponding to the matched intention vocabulary to be the search intention corresponding to the target query string; and when the target query string matches at least two intention vocabularies, obtaining a chat record from the first chat client, performing sematic analysis on the chat record, and determining a topic corresponding to the chat record; and based on a pre-configured correspondence relationship between the topic and the search intention, obtaining the search intention corresponding to the topic as the search intention corresponding to the target query string.

5. The method according to claim 1, wherein after a step of acquiring candidates corresponding to an encoded string that is inputted, and determining a target query string from the candidates, the method further comprises:

adding a preset search-triggering interface to the target query string, and displaying the search-triggering interface when the target query string is displayed; and when a triggering operation performed by a user on the search-triggering interface is determined to be received, executing to search the target query string to obtain a corresponding search result.

6. The method according to claim 1, further comprising:

after obtaining the corresponding search result, displaying the search result in the graphical user interface of the input method program without leaving the screen of the first chat client, the search result including multiple selectable candidates corresponding to the target query string, wherein extracting the corresponding target content from the search result comprises: obtaining a user selection on a target candidate among the multiple selectable candidates; and obtaining the target content corresponding to the selected target candidate.

7. The information input method according to claim 1, wherein the second target content in the first template includes a link, an activation of the link leading to a showing of at least a portion of the first target content in the second template.

8. The information input method according to claim 1, wherein the first template does not include a send button.

9. An information input method, comprising:

executing, by a terminal, an input method program in a first client;

displaying a graphical user interface of the input method program on a same screen as the first client;

acquiring, by the input method program, candidates corresponding to an encoded string that is inputted, and determining a target query string from the candidates;

searching, by the input method program, the target query string, and obtaining a corresponding search result;

extracting a first target content from the search result;

using a second template provided by the input method program to reconstruct the target content into second template information recognizable by the input method program;

displaying the second template in the graphical user interface of the input method program without leaving the screen of the first client, the second template including the first target content and a send button;

upon detecting the send button of the first client being triggered, formulating the first target content into second target content in a first template, the second target content being different than the first target content; and sending the second target content in the first template to a second client.

10. The method according to claim 9, wherein the second template information includes a sending interface, the first client is a first chat client, and the method further comprises:

when the sending interface is detected to be triggered, invoke a first template provided by the first chat client to reconstruct the second template information into first template information recognizable by the first chat client, and send the first template information to a second chat client.

11. The method according to claim 9, wherein after a step of using a second template provided by the input method program to reconstruct the target content into second template information recognizable by the input method program, and displaying the second template information in the input method interface, the method further comprising:

after receiving a triggering operation on a certain search item in the second template information, acquiring detailed information of the search item as the target content, returning to execute the step of using the second template provided by the current input method program to reconstruct the target content into the second template information recognizable by the input method program, and displaying the second template information in the current input method interface.

12. An information input device, comprising at least one processor, the at least one processor being configured for:

executing an input method program in a first chat client;

displaying a graphical user interface of the input method program on a same screen as the first chat client;

acquiring candidates corresponding to an encoded string that is inputted and determine a target query string from the candidates;

searching the target query string and obtain a corresponding search result;

extracting a first target content from the corresponding search result;

displaying, by the input method program, a second template in the graphical user interface of the input method program without leaving the screen of the first chat client, the second template including the first target content and a send button; and upon detecting the send button of the first chat client being triggered, formulating the first target content into second target content in a first template recognizable by the first chat client, the second target content being different than the first target content, and sending the second target content in the first template to a second chat client.

13. The device according to claim 12, wherein the at least one processor is further configured for:

after acquiring the candidates corresponding to the encoded string that is inputted, acquiring a chat record from the first chat client, performing sematic analysis on the chat record, and determining a topic corresponding to the chat record; based on a pre-configured correspondence relationship between the topic and a search intention, acquire acquiring the search intention corresponding to the topic; and acquiring an intention vocabulary corresponding to the search intention, matching the candidates in the intention vocabulary, and determining a successfully matched candidate as the target query string.

14. The device according to claim 12, wherein the at least one processor is further configured for:

acquiring the candidates corresponding to the encoded string that is inputted, acquiring an intention vocabulary, matching the candidates in the intention vocabulary, and determining a successfully matched candidate as the target query string, and after matching the candidates in the intention vocabulary, and after determining the successfully matched candidate as the target query string, determining a search intention corresponding to the target query string.

15. The device according to claim 12, wherein the at least one processor is further configured for:

after obtaining the corresponding search result, displaying the search result in the graphical user interface of the input method program without leaving the screen of the first chat client, the search result including multiple selectable candidates corresponding to the target query string, wherein extracting the corresponding target content from the search result comprises: obtaining a user selection on a target candidate among the multiple selectable candidates; and obtaining the target content corresponding to the selected target candidate.

* * * * *